United States Patent [19]

Bennett et al.

[11] Patent Number: 4,786,521

[45] Date of Patent: Nov. 22, 1988

[54] AQUEOUS TABLE SYRUP WITH REDUCED SUGAR CONTENT

[75] Inventors: Craig J. Bennett, Hazlet; Sharon J. Malits, Freehold, both of N.J.

[73] Assignee: General Foods Corporation, White Plains, N.Y.

[21] Appl. No.: 17,021

[22] Filed: Feb. 20, 1987

Related U.S. Application Data

[63] Continuation of Ser. No. 813,437, Dec. 26, 1985, abandoned, which is a continuation-in-part of Ser. No. 669,544, Nov. 8, 1984, abandoned.

[51] Int. Cl.$^4$ .............................. A23L 1/09
[52] U.S. Cl. .................... 426/658; 426/804
[58] Field of Search ........................ 426/658, 804

[56] References Cited

U.S. PATENT DOCUMENTS 3,362,833  1/1968  Smith ...................... 426/658
3,897,262  7/1975  Carlson .................. 426/658
4,394,399  7/1983  Keyser et al. .......... 426/658

OTHER PUBLICATIONS

National Academy of Sciences, 1965, "Chemicals Used in Food Processing", p. 31.
Junk et al., 1973, Handbook of Sugar Avi. Pub., Westport, Conn., pp. 106, 168–169.

*Primary Examiner*—Jeanette Hunter
*Attorney, Agent, or Firm*—Sam D. Walker; Thomas R. Savoie; Daniel J. Donovan

[57] ABSTRACT

An aqueous table syrup contains 15–45% sugar solids; 0–1.0% propylene glycol alginate; 0–1.5% by weight carboxymethylcellulose; up to 50% by weight maltodextrin; and water. The syrup has a viscosity of at least 200 cps at 25° C. and has qualities comparable to that of conventional table syrups containing much higher levels of sugar solids. Conventional additions such as antimycotic agents, anti-bacterial agents, salt, flavors and colors may also be present.

4 Claims, No Drawings

AQUEOUS TABLE SYRUP WITH REDUCED SUGAR CONTENT

This is a continuation of application Ser. No. 813,437, filed on Dec. 26, 1985 now abandoned, which is a continuation-in-part application of application Ser. No. 669,544, filed on Nov. 8 1984, now abandoned.

FIELD OF INVENTION

This invention relates to an aqueous table syrup of reduced sugar content. More particularly, the invention relates to an aqueous, fat-free, table syrup composition of reduced sugar content and calorie content.

Conventional table syrups include naturally occuring syrups such as maple syrup and synthetic table syrups which are intended to be comparable in quality to the naturally occurring syrups. In recent years, attempts have been made to produce synthetic syrups which are low in caloric content while remaining comparable in quality to conventional syrups. Among the qualities of conventional syrups are taste, mouthfeel, pourability, viscosity, and stability. Conventional syrups have a generally high sugar solids content which accounts to a considerable extent for qualities such as viscosity.

Attempts to produce synthetic table syrups are disclosed in U.S. Pat. No. 4,394,399 by Keyser which teaches a low calorie table syrup product consisting essentially of water, sugar, cellulose gum, salt, flavoring agent, anti-mycotic agent and sodium hexametaphosphate. Keyser further discloses a critical relationship between the cellulose gum and sugar which provide the desired consistency and mouthfeel. Also, Keyser discloses that relatively small excess amounts of carboxymethyl cellulose increases the viscosity and yield a product having unacceptable, undesirable mouthfeel. Also U.S. Pat. No. 3,897,252 by Carlson discloses a process which employs a diatomaceous earth filter aid to partially clarify a concentrated pasteurized semirefined sucrose syrup containing naturally occurring colloidal substances and combining this filtered syrup with a softened water containing carboxymethyl cellulose (CMC) in amounts to reduce the Brix and increase the viscosity of the filtered syrup. Finally, U.S. Pat. No. 3,362,833 by Smith et al. discloses an edible, stable, pourable oil-in-water emulsion suitable for use as a table syrup which comprises an aqueous phase containing at least about 65% sugar solids, an oil phase containing edible oil in an amount of about 1–40% by weight of the emulsion, and gum ghatti in an amount of about 0.1 to 1.0% of the emulsion.

It is therefore, an object of the present invention to provide an aqueous table syrup of reduced sugar solids content and reduced caloric content which is comparable in quality to conventional table syrups of higher sugar solids and caloric content.

It is a further object of the present invention to provide such table syrups having a relatively high viscosity at room temperature, and particularly those having a viscosity of 1000 cps or more at 25° C.

BRIEF SUMMARY OF THE INVENTION

The foregoing and other objects which will be apparent to those of ordinary skill in the art are achieved in accordance with the present invention by providing an aqueous table syrup comprising:

- an amount of sugar necessary to provide a finish product solids content not to exceed 55% by weight;
- a gum system; consisting of a combination of an alginate derivative such as propylene glycol alginate (PGA) and carboxymethyl cellulose wherein the amounts of PGA ranges from 0.1 to 0.5% by weight and the amount of CMC ranges from 0.3 to 0.8% by weight, and
- water in amounts sufficient to produce a finished product viscosity of at least 200 cps. at 25° C.

The composition is fat free, with reduced sugar and calories, entirely of aqueous phase, and is comparable in quality to conventional aqueous, high sugar solids, table syrups higher in caloric content.

DETAILED DESCRIPTION

The present invention is concerned with a sugar syrup, having a reduced sugar content and a viscosity building gum system. Prior to this invention, reduced sugar syrups were unable to achieve product viscosities higher than 1,000 cps without creating off flavors and undesirable textures. This invention provides the latitude to build viscosities in excess of 2,500 cps and to improve the flavor and textural characteristics of same. This invention provides the opportunity to better react to consumer demands for delivering syrups that are lower in sugar, less sweet, thicker and good tasting.

The sugar syrup of the present invention can be achieved by combining sugar solids in the form of a syrup with a gum system. The gum system should be effective to achieve viscosity building capacities in excess of 1,000 cps. Gums such as alginate derivative, carboxymethyl cellulose and combinations thereof will achieve that and optionally, maltodextrin may also be added to the combination of sugar syrup and gum system. The addition of maltodextrin further increases the viscosity building capacity, improves the syrup texture and contributes substantially to the reduced sugar attribute of the present invention.

The sugar constituent can be one or more of the conventional sugars used in table syrups such as sucrose, fructose, glucose, or the like. The sugar is preferably included in the composition in the form of a readily available liquid sugar such as liquid sucrose No. 2, high fructose corn syrup (e.g., 90% fructose, 55% fructose or 42% fructose), 63 D.E. corn syrup or 42 D.E. corn syrup. The amount of sugar solids in the syrup is preferably 15–45% by weight, more preferably 30–44%.

The alginate derivative of the present invention should have a viscosity range based on a 1¼% solution of 75 to 1200 cps at 25° C. Alginates such as propylene glycol alginate (PGA), sodium alginate and the like can be utilized. However, PGA is preferred.

The PGA used in the present invention should have a viscosity of at least about 75 cps. at 25° C., and preferably about 600–1200 cps. Propylene glycol alginates are presently available in low, medium and high viscosity grades. It is, however, preferred to use the high viscosity grade PGA. The use of lower viscosity material necessitates the use of a large quantity thereof to produce a syrup having viscosity, flow, and pour characteristics comparable to conventional syrups. While suitable characteristics of this type can be obtained, the large quantity of the additive required can adversely affect other properties, such as flavor and mouthfeel. Cost is also a major consideration. The high viscosity alginate is preferably used in an amount of from 0.1–0.5% by weight, the larger quantities being generally used when the content of sugar solids in the table syrup is relatively low.

The carboxymethylcellulose gum constituent can be any readily-available product including any of the various viscosity grades or degree of carboxymethyl substitution, and includes the soluble metal salts thereof such as sodium carboxymethylcellulose. This gum is readily-available commercially in low, medium, or high viscosity grades and with various degrees of carboxymethyl substitution. Low and medium viscosity material, with a high degree of carboxymethyl substitution, is preferred. The amount of the cellulose gum can range from 0–1.5%. However, the preferred ranges is 0.05–1% by weight. The cellulose gum is particularly preferable in syrups according to the invention having a viscosity of 1,000 cps or more at 25° C. In that event, it is preferred to use the cellulose gum in an amount of 0.3–0.8% by weight in combination with an alginate present in an amount of 0.1 to 0.5% by weight. It is important in the present invention that the ratio of CMC to alginate be 2:1 and that the percent levels not be increased above that disclosed above. As in the case of the alginate, the amount of the cellulose gum is generally higher when the sugar solids content of the syrup is relatively low.

Generally, maltodextrin has a dextrose equivalence (D.E.) of from 1 to 20. The higher the D.E. the more soluble and sweeter the maltodextrin, particularly when compared to the low D.E. maltodextrin which is less soluble and not as sweet. In the present invention the D.E. should range from 4 to 19.9 and preferably 14 to 19.9.

Maltodextrin is also readily available in any of several grades any of which can be used in this invention. The maltodextrin is preferably incorporated in the syrup formulation as liquid maltodextrin such as a 53.5% solids content 15 D.E. liquid maltodextrin. It is preferably used in an amount of 2–50% maltodextrin solids by weight. Higher amounts, in excess of 10%, are preferably used where lesser amounts of sugar solids are used in the syrup. The amount of maltodextrin is also generally higher where the amount of alginate, or alginate and cellulose gum, is relatively low. It is preferred to use maltodextrin together with cellulose gum and preferred compositions contain 0.05–0.5% alginate, 0.05–0.8% cellulose gum, and 5–20% maltodextrin solids by weight.

Preservatives such as sorbic acid, sodium benzoate, potassium sorbate, are used to stablize the syrup against microorganisms. An anti-mycotic agent such as sorbic acid is used in preferred compositions. The amount of each particular preservative can vary but will in general be on the order of 0.01–1% by weight.

An edible chelating agent such as an alkali metal hexametaphosphate, in an amount of about 0.01–0.5% by weight is preferably added for viscosity stability.

Salt and other flavorants and colorants can be added as in conventional synthetic table syrup. The amount of salt added will generally be in the range of 0–1% by weight and the amount of flavorant or colorant will generally be about 0.01–1% by weight. Combinations of colorants or flavorants may, of course, be used.

The balance of the composition is made up of water. "Soft water" is preferred. By "soft water" is meant water which has a total hardness (calcium and magnesium) content of not more than 50 ppm, preferably not more than 30 ppm. Water of greater hardness than this can be softened by conventional water softening processes. The amount of soft water in the composition can vary widely but will generally be about 30–60% by weight.

In preparing the syrup, it is preferred to make up an aqueous pre-solution containing carboxymethylcellulose gum in an amount significantly higher, generally 2–10 times higher, than the amount of gum in the syrup formulation. Small quantities of the pre-solution can be added to the product syrup, if necessary, to increase the product viscosity. Product viscosity can be decreased, of course, by adding soft water. The pre-solution is preferably made up by dissolving about 1–5% by weight carboxymethylcellulose gum in soft water. The pre-solution is preferably heated to aid dissolution of the gum. A temperature of 70°–160° F., most preferably, 100° to 140° F., is preferred. It is preferred to use the heated solution when it is fresh, preferably within 4 to 8 hours. However, the heated solution may be used after being held for longer periods of up to 90 or 100 hours.

It is also preferred to stabilize the presolution with the use of antimicrobial agents such as sorbic acid at levels of 0.01–1% and more preferable, 0.03 to 0.08%. This will extend the life of the presolution.

The syrup itself is preferably made up by blending a sufficient amount of sugar in the form of a liquid and maltodextrin as liquid maltodextrin. The liquid sugar component may conveniently contain 50–70% sugar solids and the liquid maltodextrin may conveniently contain 35–60% maltodextrin solids, both in water, preferably soft water. The mixture is preferably heated to 150°–170° F.

One or more chelating agents, such as sodium hexametaphosphate, and one or more preservatives, such as sorbic acid, are added followed by addition of high viscosity propylene glycol alginate and medium viscosity carboxymethylcellulose. The alginate and cellulose gum are conveniently added in aqueous solution in soft water by means of an eductor funnel. The ingredients are agitated at elevated temperature (150°–170° F. is suitable) for a period of time to solubilize the ingredients. The remaining sugar solids are then added, preferably as a syrup or liquid sugar, together with any required soft water. An antibacterial preservative, such as sodium benzoate may also be added, together with conventional flavors and colors. The syrup is then pasteurized such as by heating in a pasteurization loop at a temperature of 190°–210° F. for 45–90 seconds. The product is then packaged after cooling to a temperature of about 180° F. or below.

Viscosity of the product is at least about 200 cps, preferably at least 800 cps, and more preferably at least 1000 cps, at 25° C. Maximum viscosity is about 5,000 cps., and preferred viscosity is 1,300 to 1,800 cps, at 25° C.

It is also possible according to the present invention to utilize a variety of gum systems to achieve the desired texture and viscosity of the present invention. For instance, high viscosity propylene glycol alginate can be utilized at levels ranging from 0.2% to about 1.0%, preferably about 0.5%. The viscosity achieved can be as high as 2,000 cps.

It is also possible to use a combination of maltodextrin and PGA. With the addition of maltodextrin, the finished product viscosity can be adjusted up to about 5,000 cps. Whereas in the case of PGA alone the finish product viscosity can go as high as about 2,000 cps. This combination can reduce cost and gives the product greater latitude in viscosity building capabilities.

Finally, a combination of CMC and Maltodextrin will also result in an acceptable product. The addition of maltodextrin increases the viscosity building latitude of the finish product, because in the case of CMC alone, as the viscosity exceeds 800 cps it becomes unacceptably slimy and stringy. The addition of 15 DE maltodextrin increases the viscosity building potential and improves the texture of the final product.

It is generally accepted in the art that CMC produces unacceptable and undesirable mouthfeel when excess amounts are used. FIG. 1 of Keyser et al. cited supra shows the detrimental effect of increasing the CMC by 10%. The amount of CMC disclosed in Keyser et al. ranged from 0.5 to 1.0% by weight of the composition.

When the product of the present invention is produced with PGA alone as its viscosity exceeds 900 cps, it became gloppy when pouring and stabilies large quantities of air. Because of the gloppy texture, mechanical means are required to remove the air. PGA tends to pour thicker than CMC, and the apparent viscosity in the mouth is higher than the actual viscosity when compared to CMC alone. PGA has had a better long term stability at room temperature and below than CMC. However, it has poor heat stability at elevated temperatures.

When the product is produced with CMC alone, as the viscosity exceed 1000 cps it begins to develop undesirable mouthfeel characteristics, such as, a very slimy texture as disclosed in Keyser on columns 4–8, line 64. Also, the product begins to develop a very undesirable chalky flavor. On the other hand, CMC does not stabilize air in the product. However, it only has a fair, long-term stability at room temperature or below, and has fair to good heat stability.

When the desired combination of CMC and PGA is utilized, no undesirable mouthfeel characteristics even at 2500 cps was observed. No off-flavors were detected if the proper ratio of CMC and PGA were utilized For instance, to get the optimum product, the ratio of CMC to PGA should be 2:1. This combination has good long term stability at room temperature and below. However, it only has fair heat stability. The CMC/PGA combination has slight air stability. However, the air dissipates readily.

The following Examples are presented to further illustrate the invention, but it is to be understood that the invention is not limited to the details of these Examples.

EXAMPLE 1

A pre-solution is prepared by dissolving in soft water at 130° F. about 2.5% by weight of carboxymethyl cellulose and 0.065% by weight sorbic acid. The solution has a viscosity of about 5,500 cps at 25° C. A table syrup is prepared by blending the pre-solution with additional ingredients to provide a composition of the following formulation.

| Ingredients | % Formula Solids | % by Weight |
|---|---|---|
| Liquid sugar (67.5° Brix) | 20.00 | 29.60 |
| 63 D.E. Corn Syrup (43° Baume) | 20.50 | 25.00 |
| Maltodextrin 15 D.E. (dry weight basis) | 12.00 | 12.00 |
| PGA (KELCO type KDHVF) | 0.25 | 0.25 |
| CMC (Hercules type 9M31F) | 0.57 | 0.57 |

-continued

| Ingredients | % Formula Solids | % by Weight |
|---|---|---|
| Salt | 0.10 | 0.10 |
| Sorbic acid | 0.07 | 0.07 |
| Sodium benzoate | 0.07 | 0.07 |
| Sodium hexametaphosphate | 0.20 | 0.20 |
| Flavors/colors | 0.27 | 0.40 |
| Soft water | — | 31.71 |
| | 54.03% | 100.00% |

Pre-solution, liquid sugar, and the soft water are blended, and the blend is heated to about 145° F. with agitation. The PGA is added to the heated base syrup under continual agitation. After hydration of the PGA, the remaining ingredients are added. If necessary, the viscosity is reduced by the addition of soft water or raised by the addition of pre-solution. A triblender is suitable for blending the syrup. The syrup is then pasteurized and bottled. The syrup has a viscosity of about 1,500 cps at 25° C., has excellent taste, mouthfeel and pouring characteristics.

EXAMPLE 2

A pre-solution is prepared by dissolving in soft water at 130° F. about 2.5% by weight of carboxymethylcellulose and 0.065% by weight sorbic acid. The solution has viscosity of about 5,500 cps at 25° C. A table syrup is prepared by blending presolution with additional ingredients to provide a composition of the following formulation:

| Ingredients | Solids | Weight |
|---|---|---|
| Liquid sugar (67.5° Brix) | 43.00 | 63.70 |
| Propylene glycol alginate (PGA) (KELCO type KDHVF) | 0.35 | .35 |
| Carboxymethylcellulose (CMC) (Hercules type 9M31F) | 0.80 | .80 |
| Salt | 0.20 | 0.20 |
| Sorbic acid | 0.07 | 0.07 |
| Sodium benzoate | 0.07 | 0.07 |
| Sodium hexametaphosphate | 0.20 | 0.20 |
| Flavors/colors | 0.31 | 0.55 |
| Soft H$_2$O | — | 34.06 |
| | 45.00% | 100.00 |

Pre-solution, liquid sugar, and the soft water are blended, and the blend is heated to about 145° F. with agitation. The PGA is added to the heated base syrup under continual agitation. After hydration of the PGA, the remaining ingredients are added. If necessary, the viscosity is reduced by the addition of soft water or raised by the addition of pre-solution. A triblender is suitable for blending the syrup. The syrup is then pasteurized and bottled. The syrup has a viscosity of about 1500 cps at 25° C., has excellent taste, mouthful and pouring characteristics.

EXAMPLE 3

A pre-solution is made by blending 2.5% by weight carboxymethylcellulose (CMC) and 0.065% by weight sorbic acid in soft water. The pre-solution is heated in a blend tank to 130° F. to facilitate dissolution of the CMC. The solution can be held at that temperature for a considerable amount of time but is preferably used within 48 hours. Liquid sucrose #2 (67.5% solids) in an amount of 29.6 parts by weight and 22.4 parts by weight liquid maltodextrin (53.5% solids) (12.0 parts by weight solids) are blended in a second blend tank and heated to 165° F. Sodium hexametaphosphate and sorbic acid are added in amounts, respectively, of 0.2 and 0.075 parts by weight. High viscosity propylene glycol alginate (Kelco KDHVF) and carboxymethylcellulose (Hercules 9M31F) are added by means of an eductor funnel in amounts, respectively, of 0.2 and 0.45 parts by weight. Soft water heated to about 130° F. is added and agitation is maintained for about 20 minutes at a temperature of about 150° F. Corn syrup, 63 D.E. (82% solids) in an amount of 26.5 parts by weight is then added, followed by 0.075 parts by weight of sodium benzoate, and flavors and colorants as desired. The syrup thus produced has a viscosity of about 1,600 cps at 25° C. Viscosity adjustments can be made by adding water or pre-solution as appropriate to achieve the desired viscosity in this case 1,600 cps at 25° C. The syrup is heated in a pasteurization loop where it is held at 195° F. for 60 seconds, then cooled to about 150° F., and bottled. Product viscosity is 1,600 cps at 25° C. The total formulation (excluding flavor) of the syrup is as follows:

| Ingredient | % by Weight | Formula % Solids |
|---|---|---|
| Liquid sucrose #2 | 29.630 | 20.000 |
| Corn syrup (63 D.E.) | 26.000 | 20.500 |
| Liquid maltodextrin | 22.430 | 12.000 |
| Sodium hexametaphophate | 0.200 | 0.200 |
| Sodium benzoate | 0.075 | 0.075 |
| Sorbic acid | 0.075 | 0.075 |
| PGA | 0.200 | 0.200 |

-continued

| Ingredient | % by Weight | Formula % Solids |
|---|---|---|
| CMC | 0.500 | 0.500 |
| Water | 21.890 | |
| | 100.000% | 53.550 |

The syrup has excellent taste, mouthfeel and pouring characteristics.

What is claimed is:

1. An aqueous table syrup comprising, finished product sugar solids ranging from 15 to 45% by weight; maltodextrin in amounts up to 50%; a gum system consisting of a combination of propylene glycol alginate (PGA) and carboxymethyl cellulose (CMC) wherein the amounts of PGA ranges from 0.1 to 0.5% by weight and the amount of CMC ranges from 0.3 to 0.8% by weight; preservatives ranging from 0.01 to 1.0% by weight; sodium hexamethaphosphate ranging from 0.01 to 0.5%; salt ranging from 0.01 to 1.0% by weight; and sufficient water to produce a finished product viscosity of at least 1000 cps at 25° C.

2. An agueous table syrup according to claim 1 wherein the sugar solids are selected from a group consisting of liquid sucrose No. 2, high fructose corn syrup; 63 D.E. corn syrup, 42 D.E. corn syrup, 36 D.E. corn syrup, 24 D.E. corn syrup, corn syrup solids and combinations thereof.

3. An aqueous table syrup according to claim 1 wherein the amount of maltodextrin ranges from 2 to 50% by weight.

4. An aqueous table syrup according to claim 1 having a viscosity ranging from 1300 to 1800 cps at 25° C.

* * * * *